(12) United States Patent
Oshita et al.

(10) Patent No.: US 10,661,775 B2
(45) Date of Patent: May 26, 2020

(54) FUEL-SAVING CONTROL DEVICE AND FUEL-SAVING CONTROL METHOD

(71) Applicant: ISUZU MOTORS LIMITED, Shinagawa-ku, Tokyo (JP)

(72) Inventors: Wasantha Oshita, Fujisawa (JP); Tomohiko Takeda, Machida (JP); Katsunori Kikuchi, Fujisawa (JP)

(73) Assignee: ISUZU MOTORS LIMITED, Shinagawa-ku, Tokyo (JP)

( * ) Notice: Subject to any disclaimer, the term of this patent is extended or adjusted under 35 U.S.C. 154(b) by 0 days.

(21) Appl. No.: 16/341,396

(22) PCT Filed: Oct. 11, 2017

(86) PCT No.: PCT/JP2017/036754
§ 371 (c)(1),
(2) Date: Apr. 11, 2019

(87) PCT Pub. No.: WO2018/070400
PCT Pub. Date: Apr. 19, 2018

(65) Prior Publication Data
US 2020/0039497 A1 Feb. 6, 2020

(30) Foreign Application Priority Data
Oct. 12, 2016 (JP) .................. 2016-200898

(51) Int. Cl.
*B60W 10/06* (2006.01)
*B60W 30/182* (2020.01)
(Continued)

(52) U.S. Cl.
CPC .......... *B60W 10/06* (2013.01); *B60W 30/182* (2013.01); *B60W 40/072* (2013.01);
(Continued)

(58) Field of Classification Search
CPC .. B60W 10/06; B60W 30/182; B60W 40/076; B60W 2552/15; B60W 2540/10; F02D 41/123; F02D 41/3017
(Continued)

(56) References Cited

U.S. PATENT DOCUMENTS

2002/0056583 A1* 5/2002 Takano .................. B60K 28/16
180/197
2003/0216847 A1* 11/2003 Bellinger .............. B60W 10/06
701/51

(Continued)

FOREIGN PATENT DOCUMENTS

EP 1382477 A1 1/2004
JP 2008-115814 A 5/2008
(Continued)

OTHER PUBLICATIONS

Extended European Search Report for related EP App No. 17860385.8 dated Oct. 18, 2019, 8 pgs.
(Continued)

*Primary Examiner* — Mahmoud Gimie
(74) *Attorney, Agent, or Firm* — Procopio, Cory, Hargreaves & Savitch LLP

(57) ABSTRACT

A fuel-saving control device equipped with: a surplus drive force calculation unit for calculating surplus drive force; a fuel-saving control unit for executing a fuel-saving control which lowers and corrects the indicated fuel injection amount according to the accelerator position when the surplus drive force reaches or exceeds a first threshold, and stopping the fuel-saving control when the surplus drive force falls below the first threshold; a vehicle position detection unit for detecting the vehicle position; a map information storage unit for storing map information; a road information identification unit for identifying the curvature radius and gradient of the road upon which travel is planned, on the
(Continued)

basis of the vehicle position and the map information; and a flat/straight road determination unit for determining whether or not the road upon which travel is planned is a flat and straight road, on the basis of the curvature radius and gradient of the road upon which travel is planned. Therein, the fuel-saving control unit executes the fuel-saving control when the road upon which travel is planned is a flat and straight road.

7 Claims, 4 Drawing Sheets

(51) Int. Cl.
*B60W 40/072* (2012.01)
*B60W 40/076* (2012.01)
*F02D 41/12* (2006.01)
*F02D 41/30* (2006.01)

(52) U.S. Cl.
CPC ....... *B60W 40/076* (2013.01); *B60W 2540/10* (2013.01); *B60W 2552/15* (2020.02); *F02D 41/123* (2013.01); *F02D 41/3017* (2013.01)

(58) Field of Classification Search
USPC ......................................................... 701/102
See application file for complete search history.

(56) References Cited

U.S. PATENT DOCUMENTS

| 2010/0121549 A1 | 5/2010 | Fukuda et al. |
| 2013/0158767 A1 | 6/2013 | Araki |
| 2015/0322873 A1 | 11/2015 | Chen et al. |

FOREIGN PATENT DOCUMENTS

| JP | 2012-002194 A | 1/2012 |
| JP | 2012-086743 A | 5/2012 |
| JP | 2013-216287 A | 10/2013 |
| JP | 2016-061177 A | 4/2016 |

OTHER PUBLICATIONS

International Search Report and Written Opinion for related International Application No. PCT/JP2017/036754, dated Dec. 19, 2017; English translation of ISR provided; 9 pages.

* cited by examiner

US 10,661,775 B2

FUEL-SAVING CONTROL DEVICE AND FUEL-SAVING CONTROL METHOD

CROSS-REFERENCE TO RELATED APPLICATIONS

This application is a U.S. National Stage entry of PCT Application No: PCT/JP2017/036754 filed on Oct. 11, 2017, which claims priority to Japanese Patent Application No. 2016-200898, filed Oct. 12, 2016, the contents of which are incorporated herein by reference.

TECHNICAL FIELD

The present disclosure relates to a fuel-saving control device and a fuel-saving control method.

BACKGROUND ART

A fuel-saving control is widely known, in which, while a vehicle is traveling with an instructed fuel injection amount depending on an accelerator position, the instructed fuel injection amount is intentionally lowered and corrected when a surplus driving force becomes equal to or greater than a threshold value, thereby reducing an actual fuel consumption of an engine (e.g., see PTL 1). By executing the fuel-saving control, an accelerating force of the vehicle is limited. However, when the surplus driving force becomes smaller than the threshold value or a kickdown operation is detected, the fuel-saving control is stopped. As a result, a driver is hardly influenced by the limited accelerating force of the vehicle, and convenience of the driver is prevented from being greatly impaired due to execution of the fuel-saving control.

In addition to PTL 1, examples of the related art related to the fuel-saving control are also disclosed in PTL 2.

CITATION LIST

Patent Literature

[PTL 1] JP-A-2016-061177
[PTL 2] JP-A-2012-086743

SUMMARY OF INVENTION

Technical Problem

After the fuel-saving control has been stopped, it is preferable to re-execute the fuel-saving control as early as possible in order to maximally enhance a fuel-saving performance of the vehicle. Conventionally, when an accelerator position becomes equal to or lower than a threshold value and a rate of change in engine speed is equal to or smaller than a threshold value over a predetermined period of time, a travelling state of the vehicle is determined to have been changed from a variable travelling state to a stable travelling state, and then the fuel-saving control is re-executed. However, taking into consideration safety of control, namely, in terms of a safety factor, a period of time required until the travelling state of the vehicle is determined to have been changed from the variable travelling state to the stable travelling state needs to be set to be long. Therefore, it is difficult to re-execute the fuel-saving control earlier than ever before.

Accordingly, an object of the present disclosure is to provide a fuel-saving control device and a fuel-saving control method, in which after a fuel-saving control has been stopped, the fuel-saving control can be re-executed earlier than ever before.

Solution to Problem

In a first aspect of the present disclosure, there is provided a fuel-saving control device, including: a surplus driving force calculation unit for calculating a surplus driving force; and a fuel-saving control unit configured to execute a fuel-saving control for lowering and correcting an instructed fuel injection amount depending on an accelerator position when the surplus driving force becomes equal to or greater than a first threshold value, and configured to stop the fuel-saving control when the surplus driving force becomes smaller than the first threshold value, characterized by further including: a vehicle position detection unit for detecting a vehicle position; a map information storage unit for storing map information; a road information identification unit for identifying a gradient and a curvature radius of an expected travelling road on which a vehicle is expected to travel based on the vehicle position and the map information; and a flat straight road determination unit for determining whether the expected travelling road is a flat straight road, based on the gradient and the curvature radius of the expected travelling road, and after the fuel-saving control has been stopped, the fuel-saving control unit is configured to execute the fuel-saving control when the expected travelling road is the flat straight road.

The flat straight road determination unit may be configured to determine that the expected travelling road is the flat straight road, when an absolute value of the gradient of the expected travelling road is smaller than a second threshold value and the curvature radius of the expected travelling road is equal to or greater than a third threshold value.

The fuel-saving control device may further include a flat straight road length calculation unit for calculating a length of the flat straight road based on the vehicle position and the map information when the expected travelling road is the flat straight road, and the fuel-saving control unit may be further configured not to execute the fuel-saving control even if the expected travelling road is the flat straight road, when the length of the flat straight road is shorter than a fourth threshold value.

In a second aspect of the present disclosure, there is provided a fuel-saving control method, including: a surplus driving force calculation step for calculating a surplus driving force; a first fuel-saving control execution step for executing a fuel-saving control for lowering and correcting an instructed fuel injection amount depending on an accelerator position when the surplus driving force becomes equal to or greater than a first threshold value; and a fuel-saving control stop step for stopping the fuel-saving control when the surplus driving force becomes smaller than the first threshold value, characterized by further including: a vehicle position detection step for detecting a vehicle position; a road information identification step for identifying a gradient and a curvature radius of an expected travelling road on which a vehicle is expected to travel based on the vehicle position and map information; a flat straight road determination step for determining whether the expected travelling road is a flat straight road, based on the gradient and the curvature radius of the expected travelling road; and a second fuel-saving execution step for executing the fuel-saving control when the expected travelling road is the flat straight road.

In the flat straight road determination step, the expected travelling road may be determined to be the flat straight road, when an absolute value of the gradient of the expected travelling road is smaller than a second predetermined threshold value and the curvature radius of the expected travelling road is equal to or greater than a third threshold value.

The fuel-saving control method may further include a flat straight road length calculation step for calculating a length of the flat straight road based on the vehicle position and the map information when the expected travelling road is the flat straight road, and in the second fuel-saving control execution step, the fuel-saving control may not be executed even if the expected travelling road is the flat straight road, when the length of the flat straight road is shorter than a fourth threshold value.

Advantageous Effects of Invention

According to the present disclosure, the fuel-saving control device and the fuel-saving control method can be provided, in which after a fuel-saving control has been stopped, the fuel-saving control can be re-executed earlier than ever before.

DESCRIPTION OF EMBODIMENTS

Hereinafter, embodiments of the present disclosure will be described with reference to the accompanying drawings.

First, a fuel-saving control device will be described.

The fuel-saving control device is mounted on an automobile traveling by transferring a driving force of an engine to driving wheels of the vehicle via a transmission (a manual transmission vehicle or an automatic transmission vehicle).

Figure 1:
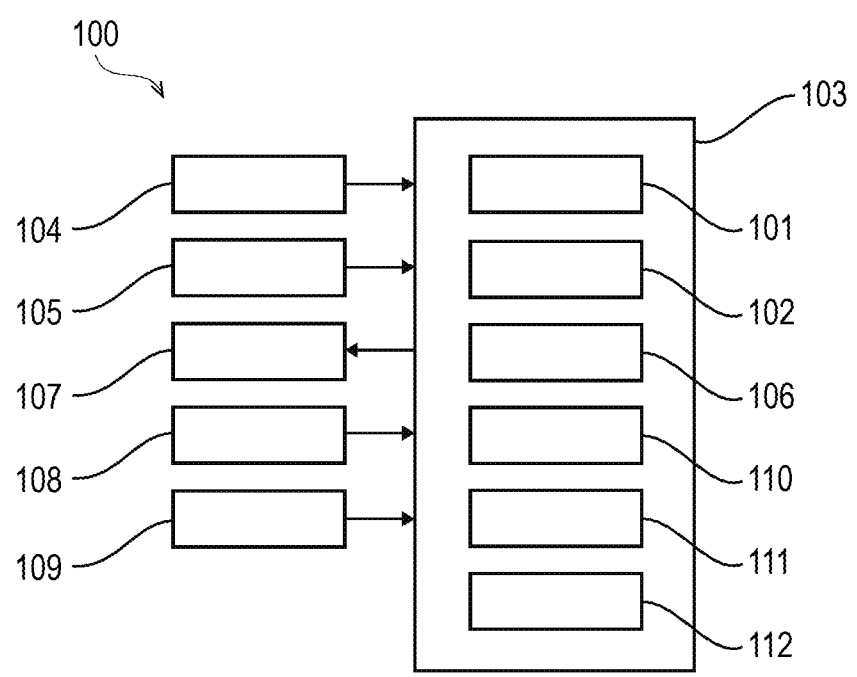
FIG. 1 is a configuration diagram of a fuel-saving control device according to an embodiment of the present disclosure.

As shown in FIG. 1, the fuel-saving control device 100 according to an embodiment of the present disclosure includes a surplus driving force calculation unit 101 for calculating a surplus driving force, and a fuel-saving control unit 102.

Typically, a vehicle travels with an instructed fuel injection amount depending on an accelerator position. However, when a surplus driving force becomes equal to or greater than a first threshold value, the fuel-saving control unit 102 executes a fuel-saving control for lowering and correcting the instructed fuel injection amount regardless of the accelerator position. Then, when the surplus driving force becomes smaller than the first threshold value, the fuel-saving control unit 102 stops the fuel-saving control.

The surplus driving force is defined by a difference between a driving force of a driving wheel and a traveling resistance on the vehicle. Also, stopping the fuel-saving control means that lowering and correcting the instructed fuel injection amount depending on the accelerator position is stopped and thus the control returns to a normal control.

The surplus driving force calculation unit 101 is configured to calculate a surplus driving force by calculating a difference between a driving force of the driving wheel and a travelling resistance force on the vehicle. The fuel-saving control unit 102 is configured to reduce an actual fuel consumption of the engine and thus to limit an accelerating force of the vehicle by intentionally lowering and correcting an instructed fuel injection amount, which originally depends on an accelerator position, regardless of the accelerator position, when the surplus driving force becomes equal to or greater than the first threshold value. Herein, limiting the accelerating force of the vehicle (a force required for accelerating the vehicle) means limiting a torque of the engine, a power of the engine and/or an acceleration of the vehicle (a rate of change in speed thereof from before the vehicle is accelerated). A controller 103 gets all variables for controlling the engine with various instruments. For example, the controller 103 gets an accelerator position with an accelerator position sensor 104 and gets an engine speed with a crank position sensor 105. Also, the controller 103 is equipped with an instructed fuel injection amount calculation unit 106 for calculating the instructed fuel injection amount depending on the accelerator position, and is configured to control a fuel injector 107 for injecting fuel into a cylinder of the engine. The fuel injector 107 is configured to inject fuel into the cylinder of the engine in accordance with the instructed fuel injection amount depending on the accelerator position.

After the fuel-saving control has been stopped, it is preferable to re-execute the fuel-saving control as early as possible in order to maximally enhance a fuel-saving performance of the vehicle. Conventionally, the fuel-saving control is re-executed when a travelling state of the vehicle is determined to have been changed from a variable travelling state to a stable travelling state.

Herein, the stable travelling state refers to a state where an accelerator position is equal to or lower than a predetermined threshold value and a rate of change in engine speed is equal to or smaller than a predetermined threshold value over a predetermined period of time.

The variable travelling state refers to a state where the accelerator position is higher than the predetermined threshold value and the rate of change in engine speed is greater than the predetermined threshold value over the predetermined period of time.

However, taking into consideration safety of control, namely, in terms of a safety factor, a period of time required until the travelling state of the vehicle is determined to have been changed from the variable travelling state to the stable travelling state needs to be set to be long. Therefore, it is difficult to re-execute the fuel-saving control earlier than ever before.

Therefore, the fuel-saving control device 100 further includes a vehicle position detection unit 108 for detecting a vehicle position, a map information storage unit 109 for storing map information, a road information identification unit 110 for identifying a gradient and a curvature radius of an expected travelling road on which the vehicle is expected to travel based on the vehicle position and the map information, and a flat straight road determination unit 111 for determining whether the expected travelling road is a flat straight road, based on the gradient and the curvature radius of the expected travelling road. Herein, the gradient and the curvature radius of the expected travelling road mean, respectively, a gradient (ascending gradient or descending gradient) and a curvature radius of a road, which ranges from a current position (vehicle position) as a start point to a position as an end position at a predetermined distance therefrom, over which the vehicle is expected to travel. However, taking into consideration a period of time required to execute a fuel-saving control method as described below, the position of the start point used for identifying the gradient and the curvature radius of the road as described above may be interpreted as a point, through which the vehicle is expected to travel in the near future (i.e., an arbitrary position in front of the vehicle). The vehicle position detection unit 108 is constituted, for example, by a global positioning system receiver. The map information storage unit 109 is constituted, for example, by a storage medium separate from the controller 103. Meanwhile, the flat straight road determination unit 111 may be configured to determine that the expected travelling road is the flat straight road, when an absolute value of the gradient of the expected travelling road is smaller than a second threshold value and the curvature radius of the expected travelling road is equal to or greater than a third threshold value. Thus, the flat straight road determination unit 111 can determine that the expected travelling road is the flat straight road, not only in a case where the expected travelling road is perfectly flat and straight but also in a case where the expected travelling road is flat and straight only to the extent that the road can be regarded as the flat straight road. It can be said that a vehicle behavior is stable even in the case where the expected travelling road is flat and straight only to the extent that the road can be regarded as the flat straight road. Therefore, there is no problem in determining that the travelling state of the vehicle has been changed from the variable travelling state to the stable travelling state.

Herein, the second threshold value represents a degree of an inclination relative to a horizontal plane by a numerical value and is a gradient value (%) or angle (degree).

In the fuel-saving control device 100, the fuel-saving control unit 102 may be further configured to immediately re-execute the fuel-saving control by determining that the travelling state of the vehicle has been changed to the stable travelling state even if the accelerator position does not become equal to or lower than the predetermined threshold value and/or the rate of change in engine speed does not become equal to or smaller than the predetermined threshold value over the predetermined period of time, when the expected travelling road is the flat straight road. It can be said that the vehicle behavior is very stable when the expected travelling road is the flat straight road. Therefore, there is no problem in determining that the travelling state of the vehicle has been changed from the variable travelling state to the stable travelling state.

Also, the fuel-saving control device 100 may further include a flat straight road length calculation unit 112 for calculating a length of the flat straight road based on the vehicle position and the map information when the expected travelling road is the flat straight road. Thus, when the length of the flat straight road is shorter than a fourth threshold value, the fuel-saving control unit 102 may be further configured not to execute the fuel-saving control even if the expected travelling road is the flat straight road. In the other words, the fuel-saving control unit 102 may be configured to execute the fuel-saving control if the length of the flat straight road is equal to or longer than the fourth threshold value. Herein, the length of the flat straight road means a distance from the current position (vehicle position) to the end point of the flat straight road. However, taking into consideration a period of time required to execute the fuel-saving control method as described below, the current position as described above may be interpreted as a point, through which the vehicle is expected to travel in the near future (i.e., an arbitrary position in front of the vehicle).

If the fuel-saving control is set to be executed even when the length of the flat straight road is extremely short, for example, in a case where the vehicle is travelling on a mountain road, in which a plurality of uphill road sections are connected to one another by a flat curve or a flat road section, the fuel-saving control is stopped when the surplus driving force becomes again smaller than the first threshold value after starting uphill-travelling beyond a flat curve of a turn section or a flat straight road section. Accordingly, executing and stopping the fuel-saving control are successively performed during a very short period of time and thus the vehicle behavior is frequently changed. As a result, the convenience and safety of the driver may be impaired.

Next, a fuel-saving control method will be described.

Figure 2:
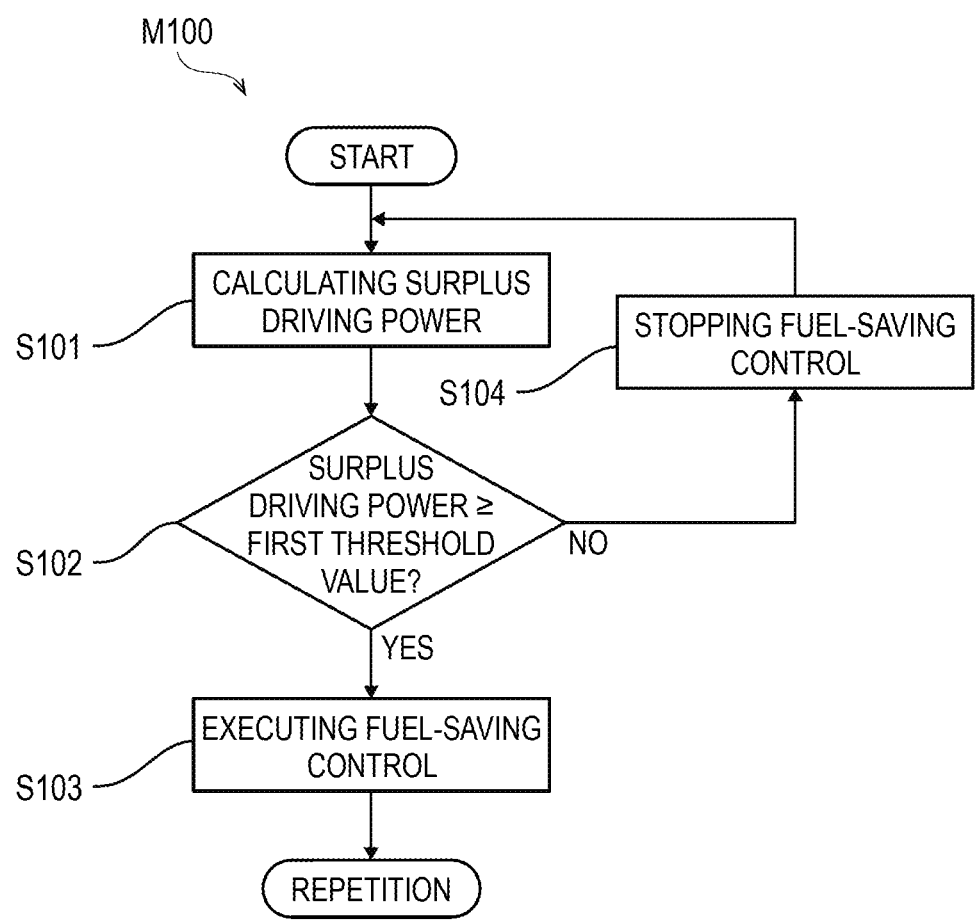
FIG. 2 is a flow chart of a basic fuel-saving control method of a fuel-saving control method according to an embodiment of the present disclosure.

As shown in FIG. 2, a fuel-saving control method according to an embodiment of the present disclosure includes a basic fuel-saving control method M100 to be executed by the fuel-saving control device 100 after an ignition key is turned on. The basic fuel-saving control method M100 includes a surplus driving force calculation step S101, a surplus driving force determination step S102, a first fuel-saving control execution step S103, and a fuel-saving control stop step S104.

In the surplus driving force calculation step S101, the surplus driving force calculation unit 101 calculates a surplus driving force. In the surplus driving force determination step S102, the fuel-saving control unit 102 determines whether the surplus driving force is equal to or greater than the first threshold value. If the surplus driving force is equal to or greater than the first threshold value, the method proceeds to the first fuel-saving control execution step S103, whereas if the surplus driving force is smaller than the first threshold value, the method proceeds to the fuel-saving control stop step S104. In the first fuel-saving control execution step S103, the fuel-saving control unit 102 executes a fuel-saving control for lowering and correcting an instructed fuel injection amount depending on an accelerator position. In the basic fuel-saving control method M100, when a fuel-saving control is re-executed after the fuel-saving control has been stopped, a travelling state is determined before the fuel-saving control is executed. Similar to the conventional case, if the accelerator position becomes equal to or lower than a threshold value and the rate of change in engine speed is equal to or smaller than a threshold value over a predetermined period of time, the travelling state of the vehicle is determined to have been changed from the variable travelling state to the stable travelling state. The fuel-saving control is not executed until the travelling state of the vehicle is changed from the variable travelling state to the stable travelling state. If the fuel-saving control is executed before the travelling state of the vehicle has been changed from the variable travelling state to the stable travelling state, i.e., in the variable travelling state, there is a possibility that a change in vehicle behavior, which is not intended by a driver, is caused. Accordingly, the convenience and safety of the driver may be impaired. In the fuel-saving control stop step S104, the fuel-saving control unit 102 stops the fuel-saving control.

Figure 3:
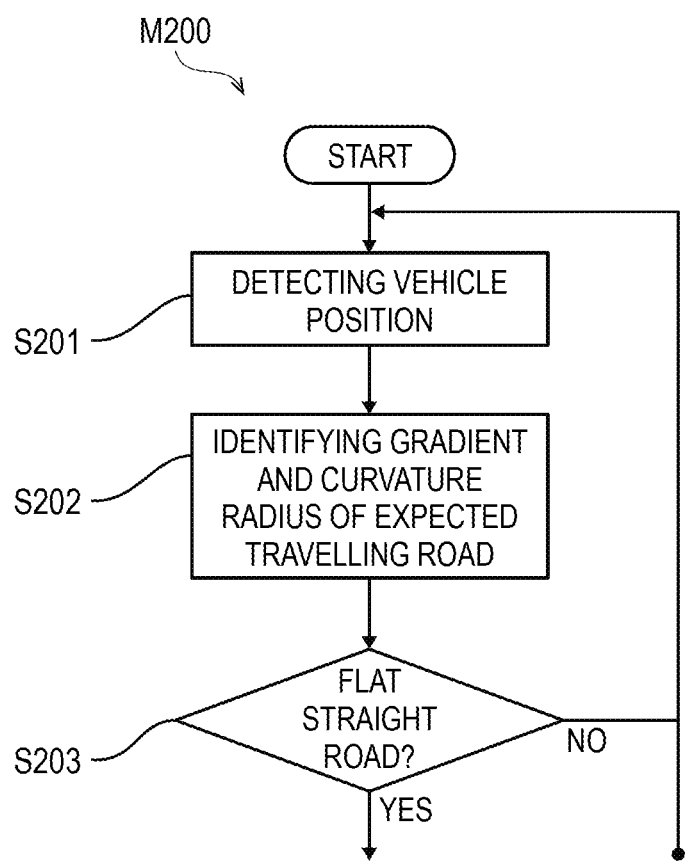
FIG. 3 is a flow chart of an extended fuel-saving control method of a fuel-saving control method according to an embodiment of the present disclosure.
Figure 4:
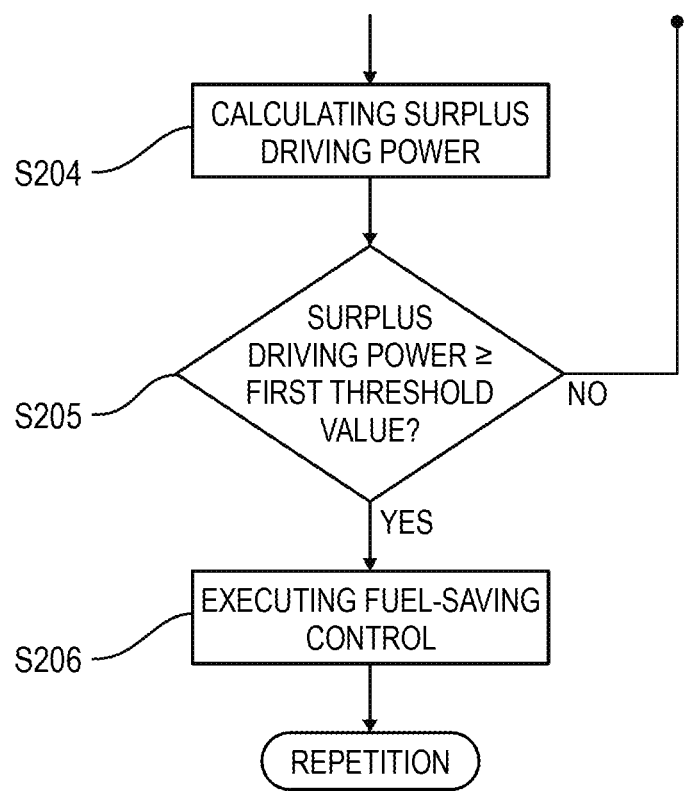
FIG. 4 is a flow chart of an extended fuel-saving control method of a fuel-saving control method according to an embodiment of the present disclosure.

Also, as shown in FIGS. 3 and 4, the fuel-saving control method according to an embodiment of the present disclosure includes an extended fuel-saving control method M200 to be executed by the fuel-saving control device 100 after the ignition key is turned on. The extended fuel-saving control method M200 includes a vehicle position detection step S201, a road information identification step S202, a flat straight road determination step S203, a surplus driving force calculation step S204, a surplus driving force determination step S205 and a second fuel-saving control execution step S206.

In the vehicle position detection step S201, the vehicle position detection unit 108 detects a vehicle position. In the road information identification step S202, the road information identification unit 110 identifies a gradient and a curvature radius of an expected travelling road on which the vehicle is expected to travel based on the vehicle position and the map information. In the flat straight road determination step S203, the flat straight road determination unit 111 determines whether the expected travelling road is a flat straight road based on the gradient and the curvature radius of the expected travelling road. When the expected travelling road is the flat straight road, the method proceeds to the surplus driving force calculation step S204, whereas when the expected travelling road is not the flat straight road, the method returns to the vehicle position detection step S201. Also, in the flat straight road determination step S203, the expected travelling road is determined to be the flat straight road, when an absolute value of the gradient of the expected travelling road is smaller than the second threshold value and the curvature radius of the expected travelling road is equal to or greater than the third threshold value. In the surplus driving force calculation step S204, the surplus driving force calculation unit 101 calculates a surplus driving force in the same manner as the surplus driving force calculation step S101 as described above. In the surplus driving force determination step S205, the fuel-saving control unit 102 determines whether the surplus driving force is equal to or greater than the first threshold value in the same manner as the surplus driving force determination step S102 as described above. When the surplus driving force is equal to or greater than the first threshold value, the method proceeds to the second fuel-saving control execution step S206, whereas when the surplus driving force is smaller than the first threshold value, the method returns to the vehicle position detection step S201. In the second fuel-saving control execution step S206, the fuel-saving control unit 102 executes the fuel-saving control. Accordingly, in the extended fuel-saving control method M200, it is possible to immediately re-execute the fuel-saving control when the expected travelling road is the flat straight road, even if the accelerator position does not become equal to or lower than the threshold value and/or the rate of change in engine speed does not become equal to or smaller than the threshold value over the predetermined period of time.

Further, the extended fuel-saving control method M200 may further include a flat straight road length calculation step for calculating a length of the flat straight road based on the vehicle position and the map information when the expected travelling road is the flat straight road. Thus, in the second fuel-saving control execution step S206, the fuel-saving control may not be executed even if the expected travelling road is the flat straight road, when the length of the flat straight road is shorter than the fourth threshold value. Thus, it is necessary to execute the flat straight road length calculation step prior to executing the second fuel-saving control execution step S206. Also, it is necessary to execute a flat straight road length determination step after executing the flat straight road length calculation step but prior to executing the second fuel-saving control execution step S206. In the flat straight road length determination step, it is determined whether the length of the flat straight road is equal to or greater than the fourth threshold value. When the length of the flat straight road is equal to or greater than the fourth threshold value, the method proceeds to the next step, whereas when the length of the flat straight road is smaller than the fourth threshold value, the method returns to the vehicle position detection step S201.

As described above, when the expected travelling road is the flat straight road and therefore it is assumed that the travelling state of the vehicle has been changed from the variable travelling state to the stable travelling state, the fuel-saving control is immediately re-executed even if the accelerator position does not become equal to or lower than the threshold value and/or the rate of change in engine speed does not become equal to or smaller than the threshold value over the predetermined period of time. Therefore, after the fuel-saving control has been stopped, the fuel-saving control can be re-executed earlier than ever before. In particular, in the case of the manual transmission vehicles, it is possible to push the driver to perform upshifting in advance by limiting an accelerating force of the vehicles. As a result, it is possible to greatly enhance the fuel-saving performance of the vehicle by executing the fuel-saving control.

This application is based on Japanese Patent Application No. 2016-200898 filed on Oct. 12, 2016, the entire contents of which are incorporated herein by reference.

INDUSTRIAL APPLICABILITY

The present disclosure has effects that after the fuel-saving control has been stopped, the fuel-saving control can be re-executed earlier than ever before, and is useful for a fuel-saving control device and a fuel-saving control method and the like.

REFERENCE SIGNS LIST

100: Fuel-saving control device
101: Surplus driving force calculation unit
102: Fuel-saving control unit
103: Controller
104: Accelerator position sensor
105: Crank position sensor
106: Instructed fuel injection amount calculation unit
107: Fuel injector
108: Vehicle position detection unit
109: Map information storage unit
110: Road information identification unit
111: Flat straight road determination unit
112: Flat straight road length calculation unit
M100: Basic fuel-saving control method
S101: Surplus driving force calculation step
S102: Surplus driving force determination step
S103: First fuel-saving control execution step
S104: Fuel-saving control stop step
M200: Extended fuel-saving control method
S201: Vehicle position detection step
S202: Road information identification step
S203: Flat straight road determination step
S204: Surplus driving force calculation step
S205: Surplus driving force determination step
S206: Second fuel-saving control execution step

The invention claimed is:
1. A fuel-saving control device, comprising:
a surplus driving force calculation unit for calculating a surplus driving force;
a fuel-saving control unit configured to execute a fuel-saving control for lowering and correcting an instructed fuel injection amount depending on an accelerator position when the surplus driving force becomes equal to or greater than a first threshold value, and configured to stop the fuel-saving control when the surplus driving force becomes smaller than the first threshold value, a vehicle position detection unit for detecting a vehicle position;

a map information storage unit for storing map information;

a road information identification unit for identifying a gradient and a curvature radius of an expected travelling road on which a vehicle is expected to travel based on the vehicle position and the map information; and a flat straight road determination unit for determining whether the expected travelling road is a flat straight road, based on the gradient and the curvature radius of the expected travelling road, wherein, after the fuel-saving control has been stopped, the fuel-saving control unit is configured to execute the fuel-saving control when the expected travelling road is the flat straight road.

2. The fuel-saving control device according to claim 1, wherein the flat straight road determination unit is configured to determine that the expected travelling road is the flat straight road, when an absolute value of the gradient of the expected travelling road is smaller than a second threshold value and the curvature radius of the expected travelling road is equal to or greater than a third threshold value.

3. The fuel-saving control device according to claim 1, further comprising:

a flat straight road length calculation unit for calculating a length of the flat straight road based on the vehicle position and the map information when the expected travelling road is the flat straight road, wherein the fuel-saving control unit is further configured not to execute the fuel-saving control even if the expected travelling road is the flat straight road, when the length of the flat straight road is shorter than a fourth threshold value.

4. A fuel-saving control method, comprising:
calculating a surplus driving force;
executing a fuel-saving control for lowering and correcting an instructed fuel injection amount depending on an accelerator position when the surplus driving force becomes equal to or greater than a first threshold value;
stopping the fuel-saving control when the surplus driving force becomes smaller than the first threshold value,
detecting a vehicle position;

identifying a gradient and a curvature radius of an expected travelling road on which a vehicle is expected to travel based on the vehicle position and map information;

determining whether the expected travelling road is a flat straight road, based on the gradient and the curvature radius of the expected travelling road; and executing the fuel-saving control when the expected travelling road is the flat straight road.

5. The fuel-saving control method according to claim 4, wherein the expected travelling road is determined to be the flat straight road, when an absolute value of the gradient of the expected travelling road is smaller than a second threshold value and the curvature radius of the expected travelling road is equal to or greater than a third threshold value.

6. The fuel-saving control method according to claim 4, further comprising:

calculating a length of the flat straight road based on the vehicle position and the map information when the expected travelling road is the flat straight road, wherein the fuel-saving control is not executed even if the expected travelling road is the flat straight road, when the length of the flat straight road is shorter than a fourth threshold value.

7. A fuel-saving control device, comprising:
a vehicle position detector that detects a vehicle position;
a map information storage that stores map information, and
a controller configured to:
calculate a surplus driving force;
execute a fuel-saving control for lowering and correcting an instructed fuel injection amount depending on an accelerator position when the surplus driving force becomes equal to or greater than a first threshold value, and stop the fuel-saving control when the surplus driving force becomes smaller than the first threshold value;
identify a gradient and a curvature radius of an expected travelling road on which a vehicle is expected to travel based on the vehicle position and the map information; and
determine whether the expected travelling road is a flat straight road, based on the gradient and the curvature radius of the expected travelling road,
wherein, after the fuel-saving control has been stopped, the fuel-saving control unit is configured to execute the fuel-saving control when the expected travelling road is the flat straight road.

* * * * *